June 6, 1961 K. E. SCHREINER ET AL 2,987,253

INFORMATION-HANDLING APPARATUS

Filed Feb. 14, 1958 6 Sheets-Sheet 6

United States Patent Office 2,987,253
Patented June 6, 1961

2,987,253

INFORMATION-HANDLING APPARATUS

Kenneth E. Schreiner, Harrington Park, and Byron L. Havens, Closter, N.J., assignors to International Business Machines Corporation, New York, N.Y., a corporation of New York Filed Feb. 14, 1958, Ser. No. 715,353
25 Claims. (Cl. 235—176)

This invention relates to information-handling apparatus.

The invention is particularly applicable to systems for combining information in accordance with given rules of combination.

The invention relates still more particularly to systems in which the organization is favorable to the use of phase-modulated waves to represent information. The information thus represented may be of a wide variety of types, including, for example, digits, sensed quantities, commands, logical operations, control information, or other forms of intelligence.

Thus, for example, in a computer, the binary digit "one" may be represented by a wave of one phase with respect to a fixed phase standard and the binary digit "zero" may be represented by a wave the phase of which is materially different from that of the first-mentioned wave, the phase difference preferably being substantially 180 degrees.

A feature of the invention is the adaptability of the system to the use of electromagnetic waves of very high, or ultra-high frequencies, commonly called microwaves, of, for example, ten kilomegacycles per second or more, although the invention may also be used at other frequencies.

The invention when embodied in a digit combining system is adapted for use either in a serial combining system, that is, one in which the successive digits of like denomination in the numbers to be combined are combined in a single apparatus unit which is used successively to give the desired result, digit by digit, or in a parallel combining system, that is, one in which a separate apparatus unit is assigned permanently for use with the digits of each different denomination and the apparatus units operate substantially simultaneously to determine the digits of the desired result.

An object of the invention is to increase the speed of operation of an information-handling system.

Another object of the invention when used in apparatus for adding digits is to reduce the delay in determining the necessary carry digit at any stage of an addition operation and in making this carry digit available later for use in the succeeding stage of the addition.

Still another object is to provide improved memory apparatus.

The invention is adaptable to the use of microwave elements such as "magic-T" waveguide junctions, balanced diode detectors and modulators, coaxial transmission lines, hollow metal waveguides, traveling wave tube devices, etc., which can be used for very high speed transmission of signals. For example, if ten cycles of an alternating wave are required to transmit one bit of information, for example, one binary digit, the bit interval required to transmit intelligence by means of a ten kilomegacycle wave is only one millimicro-second.

The use of phase-modulated waves of a reliable type in the systems described herein makes it possible to represent different bits of information by waves of substantial and closely equal amplitude, thereby reducing the effects of noise and other interfering waves.

In one illustrative form of the invention, there is provided a system for combining information from various sources according to a given rule of combination. The information from the sources is first translated into a plurality of phase-modulated waves, distinguishable from one another as to phase. Means are provided for sensing the phases of these phase-modulated waves and for controlling the phase of a phase-modulated output wave in accordance with the result of the sensing operation, to indicate by the phase of the output wave the result of combining the information from the sources in accordance with the given rule.

In such a system, or for certain other applications, there may be employed memory apparatus including a regenerative loop and means for establishing oscillations in the loop capable of assuming any one of a plurality of stable phase conditions. Means are provided for impressing a phase-modulated wave upon the loop to initiate a change in the established oscillations to conform to the phase condition represented by the impressed wave, if the established oscillations are not already in that phase condition. A characteristic of the memory apparatus is that the phase condition of the oscillations, once established, persists until a phase-modulated wave of a different phase and of over-riding amplitude is impressed upon the regenerative loop.

Other features, objects and advantages will appear from the following more detailed description of an illustrative embodiment of the invention, which will now be given in conjunction with the accompanying drawings.

Figures 1, 3, 5:
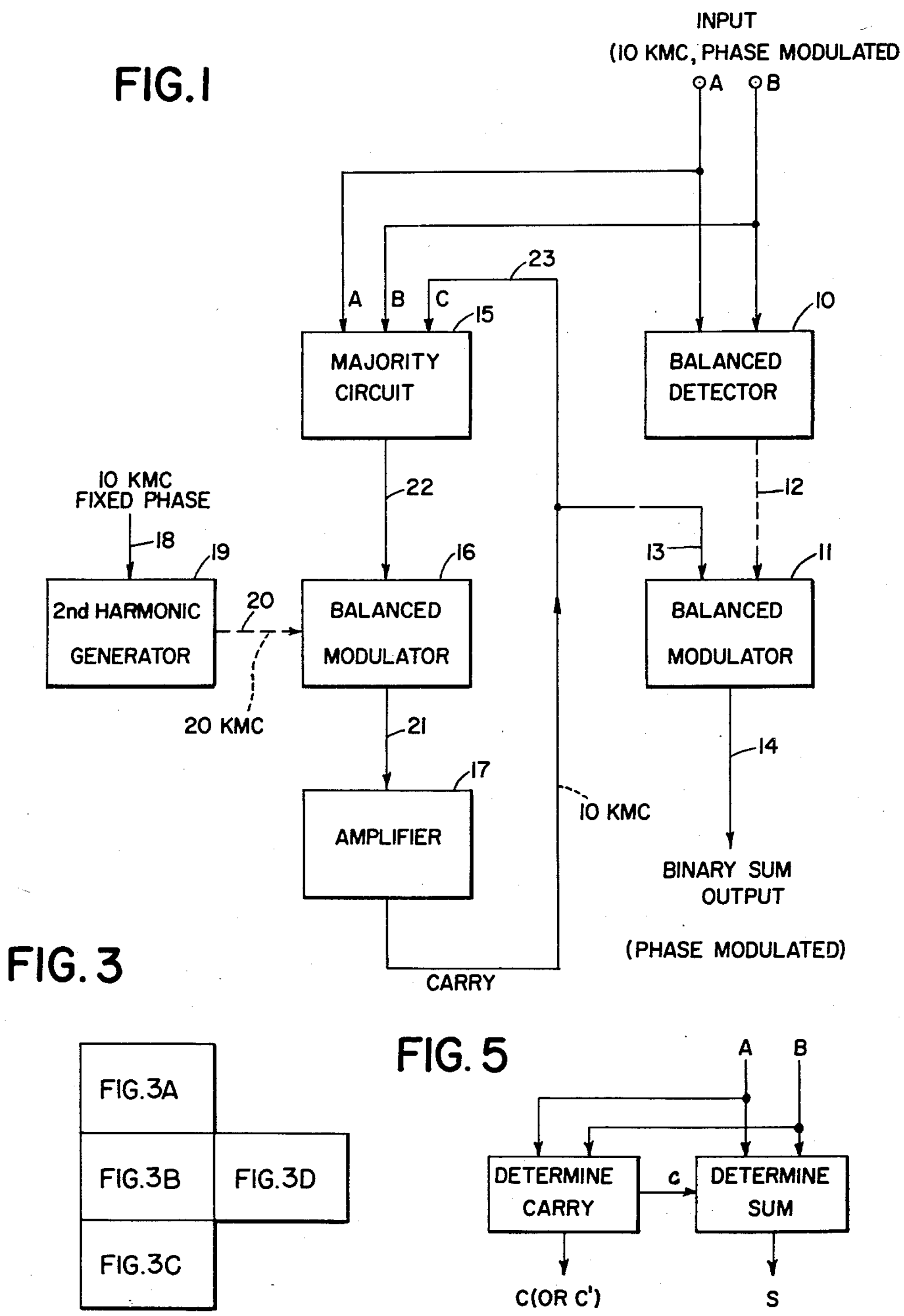
FIG. 1 is a schematic block diagram of a binary full adding system embodying the invention.
FIG. 3 shows how
Figure 2:
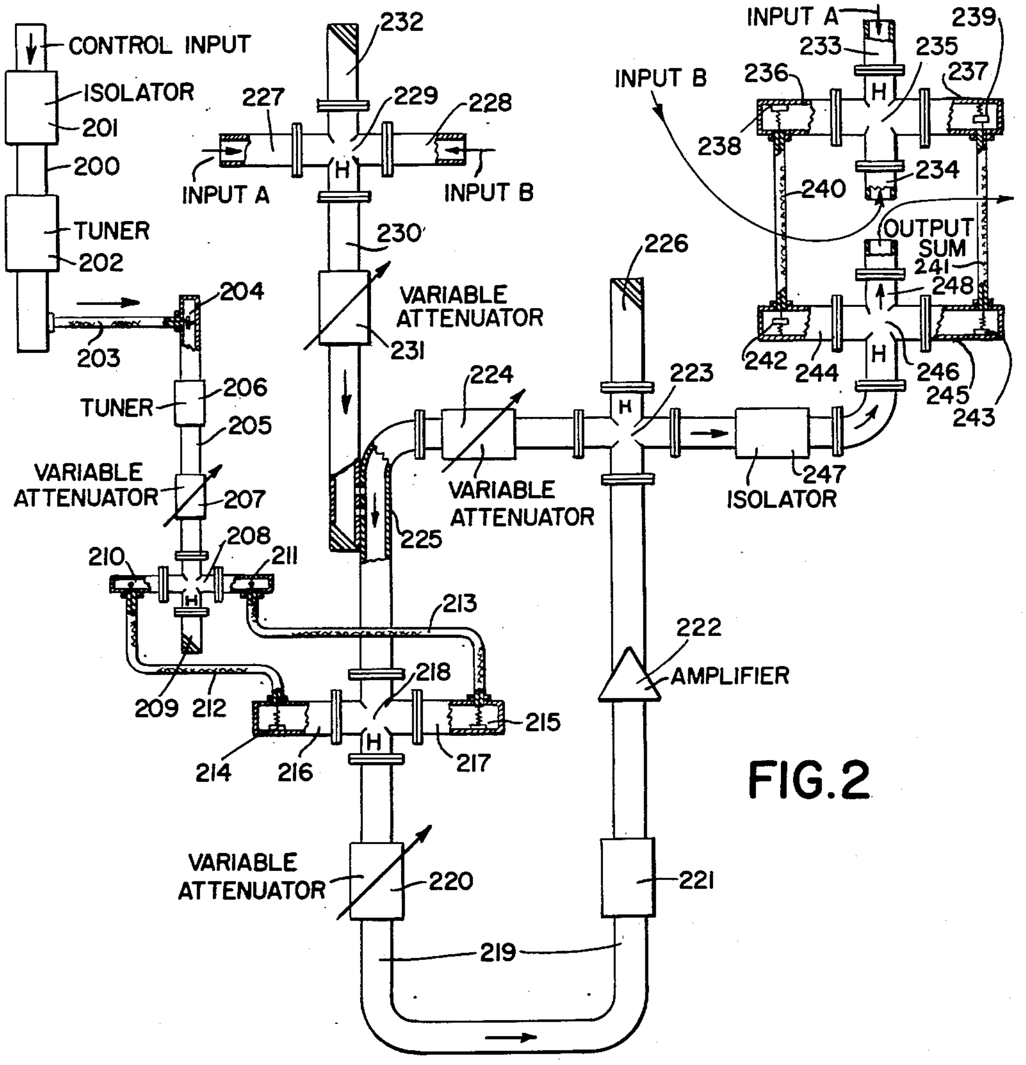
FIG. 2 is a schematic diagram of a system of interconnected microwave devices substantially in accordance with the block diagram of FIG. 1.
Figure 4:
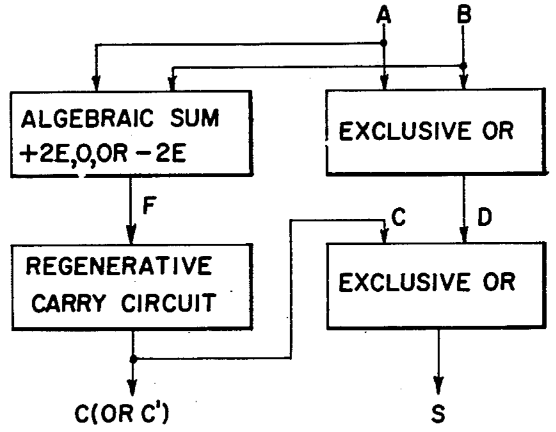
Figure 3A:
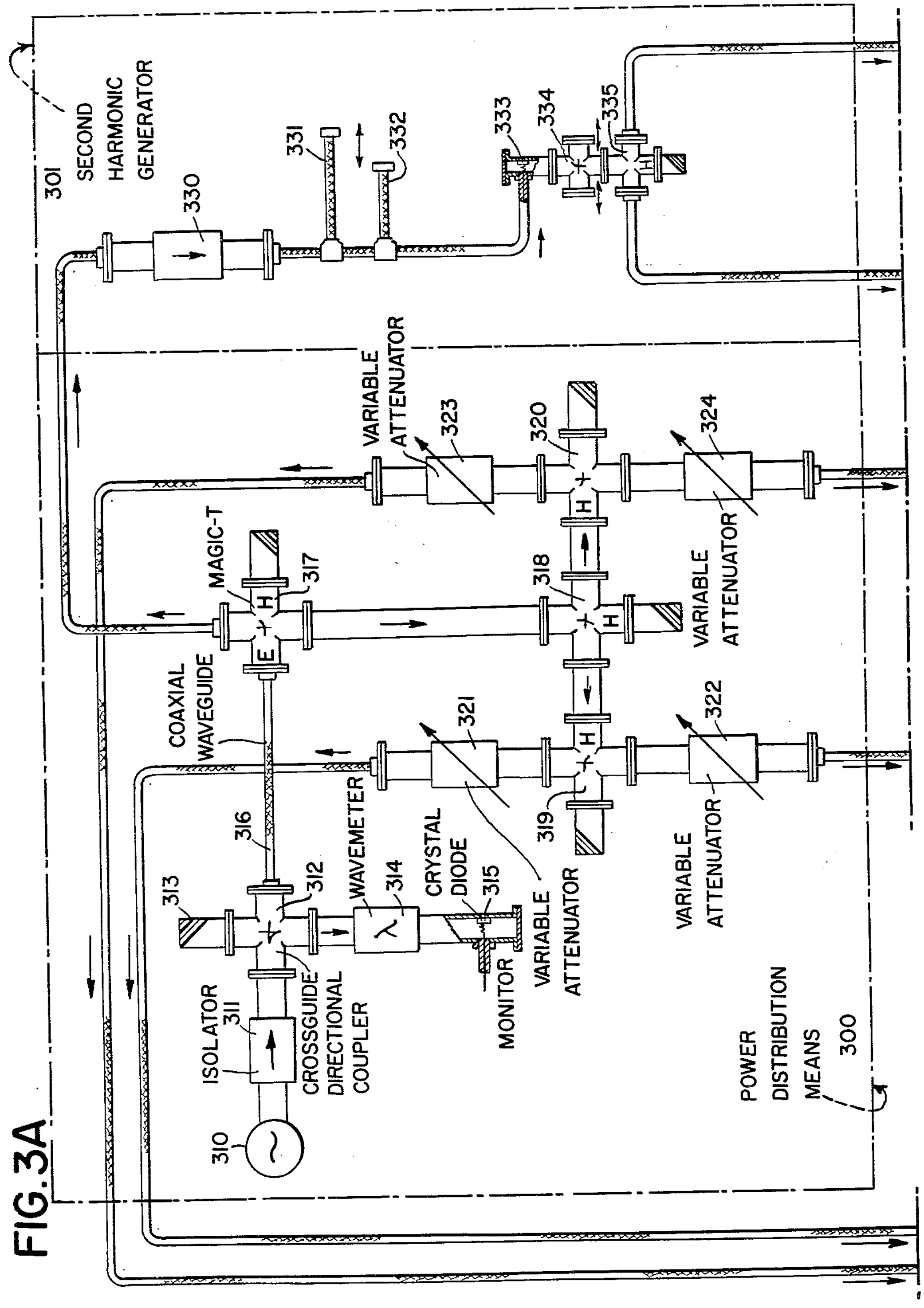
FIGS. 3A, 3B, 3C and 3D are to be arranged to form a detailed schematic diagram of a microwave system similar to the system shown in FIG. 2 but varying therefrom in certain respects, and illustrating an embodiment of the invention.
Figure 3B:
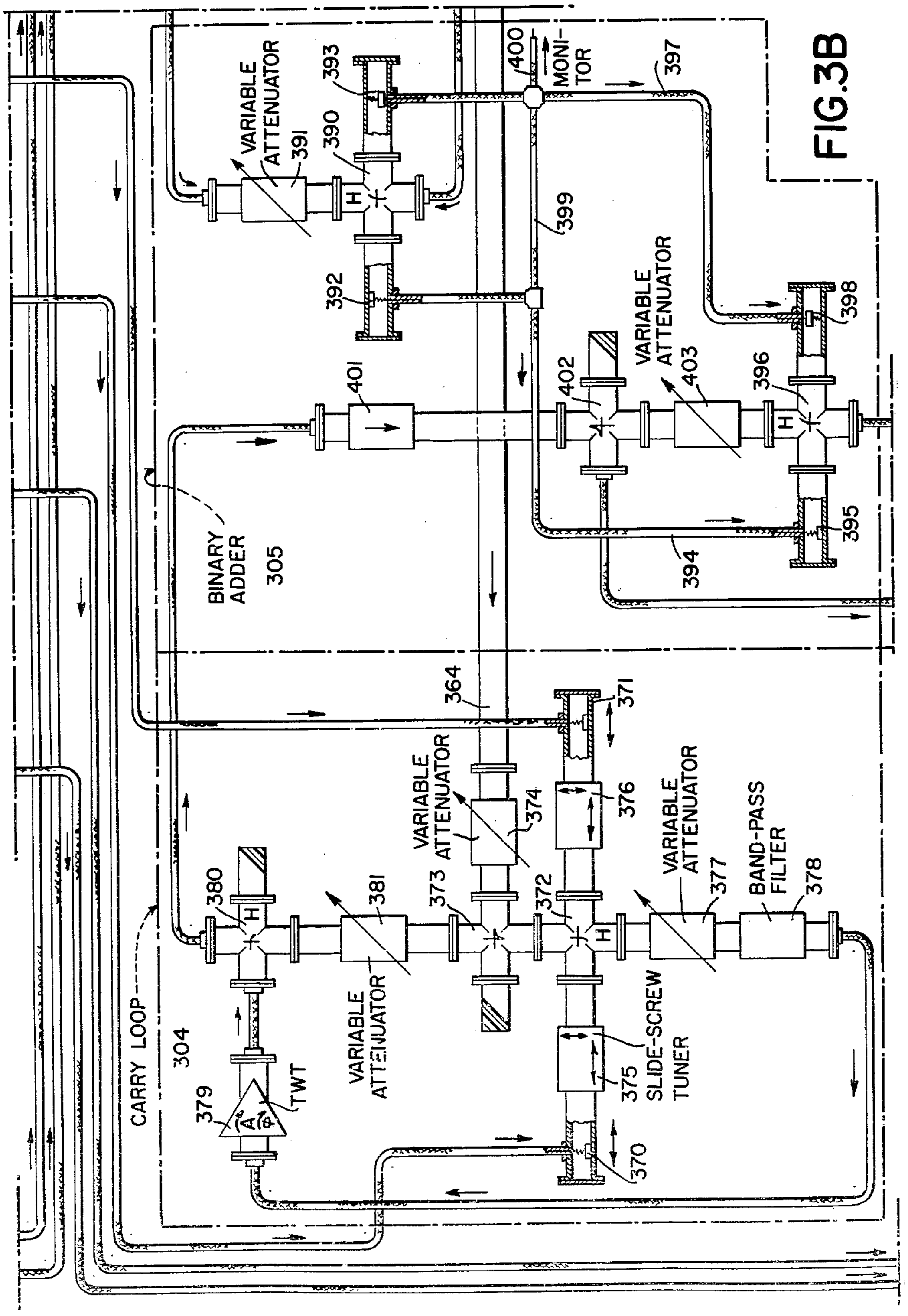
Figure 3C:
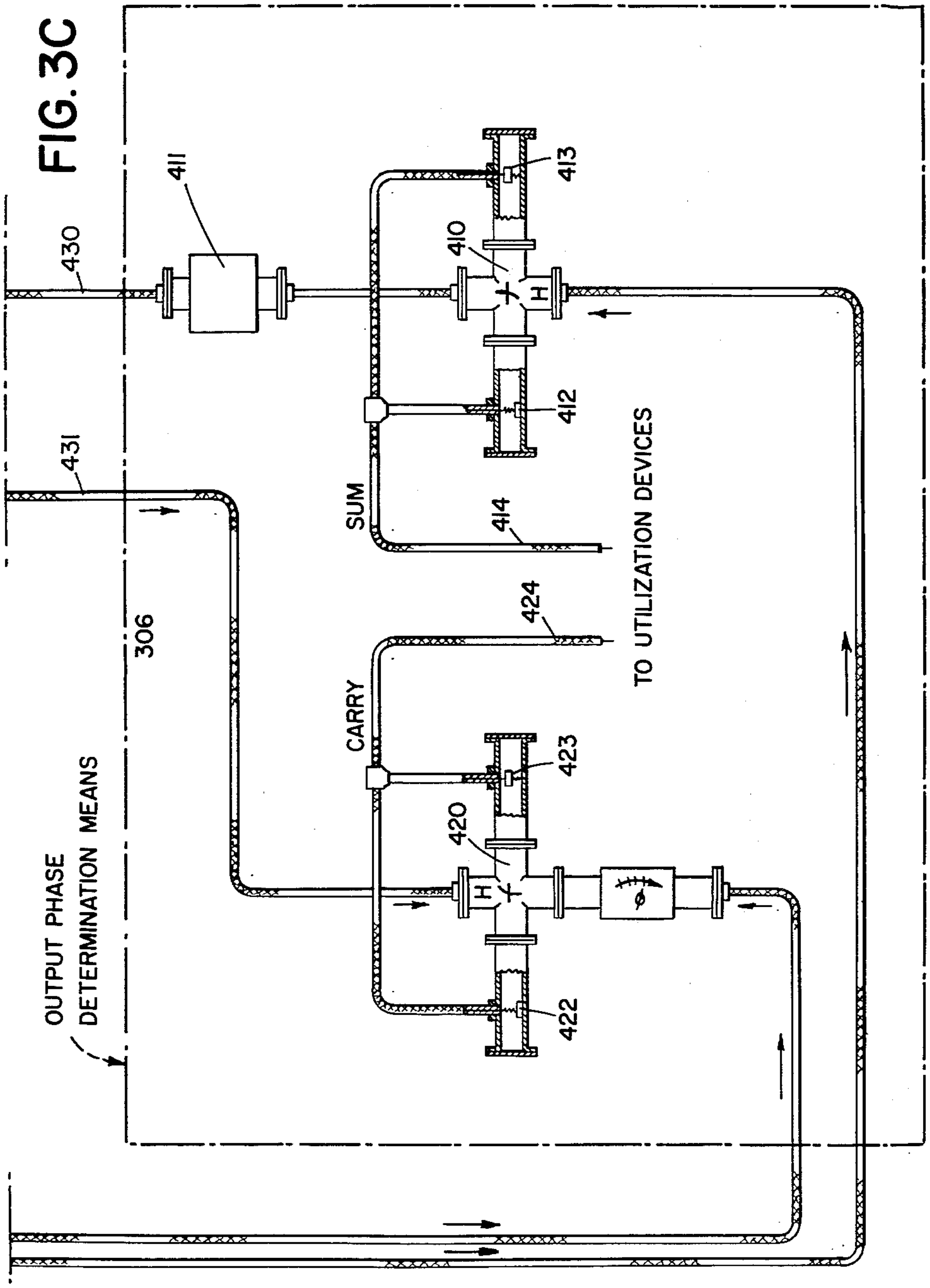
Figure 3D:
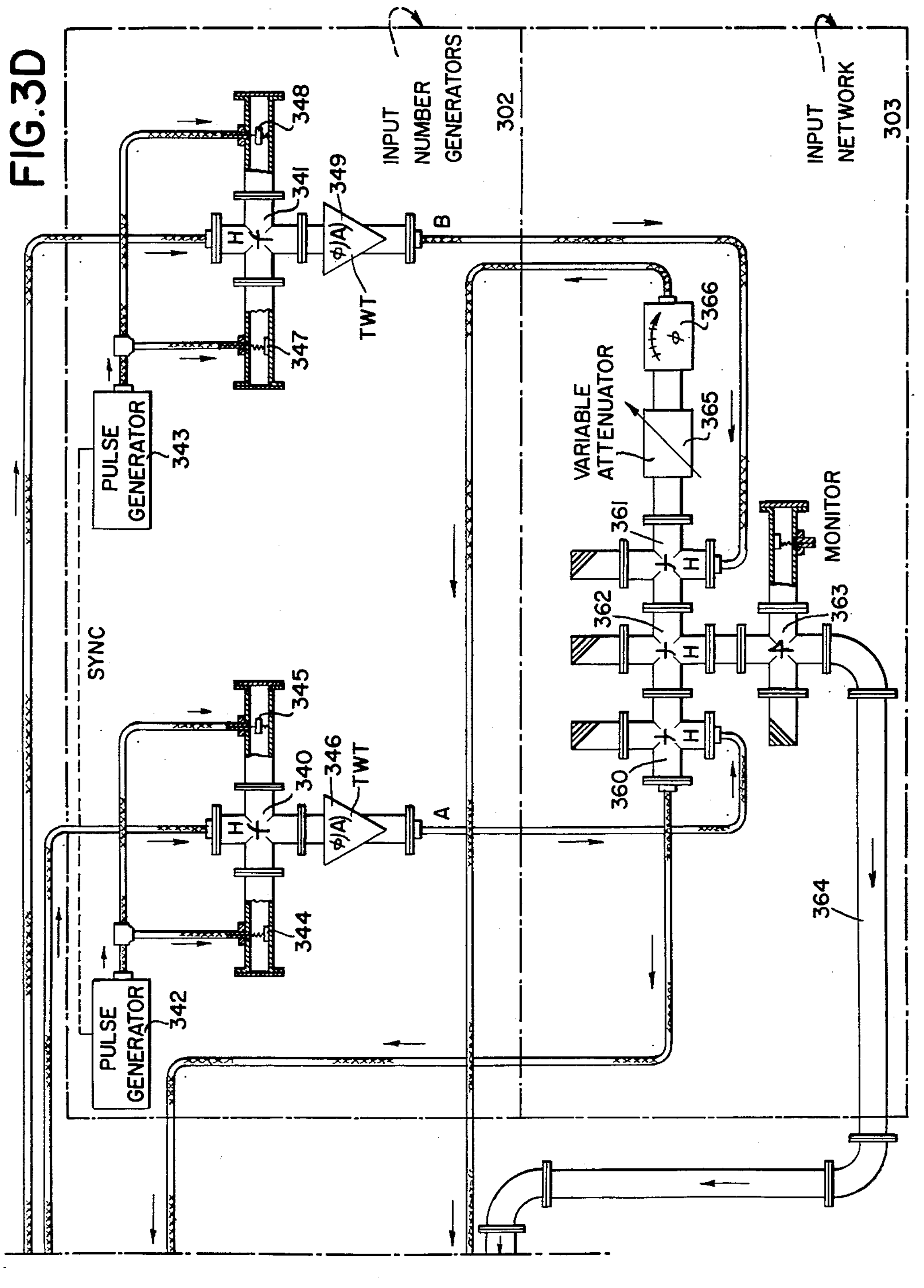

FIGS. 3A, 3B, 3C and 3D are the component parts of the composite drawing represented in FIG. 3, FIG. 3A showing power distribution means and a second-harmonic generator, FIG. 3B showing a carry loop and a binary adder, FIG. 3C showing output phase determining means, and FIG. 3D showing input number generators and an input network, all being component parts described hereinbelow in connection with the system of FIG. 3 as a whole;

FIG. 4 is a block schematic diagram summarizing the operation of a system like that shown in FIG. 2; and FIG. 5 is a block schematic diagram more concisely representing the system of FIG. 4.

An illustrative system will be described in which the invention is used in a binary computer of a type known as a binary full adder.

The term "full adder" as used in the computer art means an adder which takes account of the necessary carry.

Referring to FIG. 1, phase-modulated electromagnetic waves of frequency ten kilomegacycles per second, for example, are applied as two independent inputs at points A and B, respectively. The system of FIG. 1 comprises three related portions, viz., a binary sum determining portion, a carry determining portion, and a phase reference portion. In the binary sum determining portion, the applied input waves at A and B are compared in a balanced detector 10. If the waves at A and B, hereinafter referred to as wave A and wave B respectively, are of phases opposite to each other, a pulse of one polarity is transmitted from balanced detector 10 to a balanced modulator 11 over a path 12. If the waves A and B are of like phase, a pulse of an opposite polarity is transmitted over path 12. A phase-modulated wave representing the presence or absence of a carry from the preceding stage of the addition process is applied to the balanced modulator 11 over a path 13. The pulse transmitted over the path 12 controls the balanced modulator 11 in such a way as to determine the phase of the output wave from the modulator 11 which is delivered over a path 14 and represents the final binary sum digit for the given stage of the addition process, taking account of the carry, if any, from the preceding stage.

Wherever herein the phase of a phase-modulated wave is described or specified, it is to be understood that the phase depends upon the point in the system at which the phase is observed, and at a given point in the system the phase of a phase-modulated wave is relative to the phases of other phase-modulated waves at the same point. Furthermore, it will be noted that inversion of phase occurs at points electrically separated from a given point by one-half wavelength, so that length of waveguide or of coaxial cable having an electrical length of an odd number of half wavelengths serves as an inverter, for use wherever the logical operation of inversion is required.

The carry to the succeeding stage is determined in a carry loop comprising a majority circuit 15, a balanced modulator 16, and an amplifier 17. The waves A and B, respectively, are applied to the majority circuit 15 as well as to the balanced detector 10 as hereinabove described, together with a fedback carry wave from the output of the amplifier 17, which fedback carry wave is also led over the path 13 as an input of modulator 11 as hereinabove described. The modulator 16 is controlled by phase-modulated waves of reference phase and of the same frequency as the waves A and B, applied over a path 18 to a second-harmonic generator 19, whereby a wave of twice the original frequency supplied over a path 20 constrains the modulator 16 to deliver over a path 21 an output wave of one or the other of only two phases when a wave of the original frequency is applied to its input over a path 22 from the majority circuit 15. Which of the two possible phases to appear in the path 21 is determined in the first instance by the phase of the wave applied to the path 22 by the majority circuit 15. The phase of the wave in the path 22 in turn depends upon the phases of the three input waves applied to the majority circuit 15. If the majority of the three input phases changes from one phase to the other, the phase in the path 22 changes accordingly and the phase of the output of modulator 16 in the path 21 also changes. A certain reaction time is required, however, to effect the change of phase, which change then progresses around the carry loop, eventually arriving at the path 13 and then at a path 23 as a fedback input to the majority circuit 15. Inasmuch as the loop is normally in a state of strong oscillations, an over-riding wave of relatively large amplitude is required to effect a change of phase.

The carry loop functions substantially as a frequency divider or subharmonic generator in which the output frequency is one-half of the input frequency.

TABLE 1

| C (Carry from Preceding Stage) | A | B | S (Sum, taking account of carry) | C′ (Carry to succeeding stage) | Phase of S relative to C | Majority of C, A, and B |
|---|---|---|---|---|---|---|
| 0 | 0 | 0 | 0 | 0 | Same | 0 |
| 0 | 1 | 0 | 1 | 0 | Opposite | 0 |
| 0 | 0 | 1 | 1 | 0 | Opposite | 0 |
| 0 | 1 | 1 | 0 | 1 | Same | 1 |
| 1 | 0 | 0 | 1 | 0 | Same | 0 |
| 1 | 1 | 0 | 0 | 1 | Opposite | 1 |
| 1 | 0 | 1 | 0 | 1 | Opposite | 1 |
| 1 | 1 | 1 | 1 | 1 | Same | 1 |

Reference is made to Table 1 to explain how the system of FIG. 1 operates to effect full addition of any two binary digits represented by phase modulated waves applied at A and B respectively, taking account of carry, if any, from the preceding stage. The table shows the eight possible combinations of two binary digits, with and without a carry from the preceding stage. The column marked S gives the final binary sum of the digit at A, the digit at B, and the carry C from the preceding stage, shown in the columns A, B, and C, respectively. The column marked C′ gives the carry digit that must be carried to the succeeding stage.

Table 1 reveals the following rule for the final binary sum in any stage of the addition, namely, if A, B, and C are all three alike, the sum S is the same as the three like digits, and if A, B, and C are divided two and one in any manner, the sum S is the same as the odd digit. It also appears that if C and S are compared, C and S are the same whenever A and B are equal, and C and S are unlike (or opposite) whenever A and B are unlike. The table further reveals that the carry C′ to the succeeding stage is in every case equal to the majority of A, B, and C.

The system of FIG. 1 compares the phases of the waves A and B in the balanced detector 10. If the phases of waves A and B are the same, the detector 10 transmits a pulse of one polarity over path 12 which sets up the balanced modulator 11 in such a way as to allow a carry wave from path 13 to pass without phase change throught the modulator 11 to the output path 14, thereby producing a sum output representing the same digit as the carry digit from the preceding stage, as required by the rule for the binary sum hereinabove stated. If, on the other hand, the phases of A and B are unlike, that is opposite to each other, the detector 10 transmits a pulse of the other polarity over path 12 which sets up the balanced modulator 11 in such a way as to change the phase of the output of the modulator 11 so that the sum output produced in the path 14 is opposite to the phase of the carry wave in the path 13, thereby producing a sum output representing the opposite binary digit as compared to the carry digit from the preceding stage, again as required by the rule.

The system of FIG. 1 also compares all three input waves A, B, and C in the majority circuit 15 and when a change of carry is needed adjusts the phase of the output wave to conform to the majority of the input waves, as required by the rule hereinabove stated for the determination of the carry to be made to the succeeding stage, thus completing the mechanization of the process of binary full addition. In case the carry to the succeeding stage is the same as the carry from the preceding stage no change is required in the output wave in path 22 and the arrangement of the system of FIG. 1 is such that no change occurs in the output wave in path 22.

FIG. 2 shows a system of the same general type as the system of FIG. 1 and in somewhat greater detail. The control input wave, for example of frequency ten kilomagacycles per second and of substantially fixed or reference phase, is impressed upon a suitable waveguide 200. Inserted in tandem in the waveguide 200 are an isolator 201, which is a one-way transmission device to prevent reaction of the control system upon the source of the control input wave, and a tuner 202 for tuning the control system to the frequency of the control wave. A coaxial conductor transmission line or coaxial cable 203 connects from a suitable point on the waveguide 200 to a crystal diode 204 contained at a suitable point near one end of a waveguide 205, which waveguide is proportioned for transmission of the second harmonic $2f$ of the frequency $f$ of the control input, this harmonic being contained in the output wave from the crystal diode 204. Inserted in tandem in the waveguide 205 are a tuner 206, tuned to the frequency $2f$, a variable or adjustable attenuator 207, and a hybrid waveguide junction 208 of the type commonly called a magic-T, the location of the H-arm of the magic-T being indicated at H in the drawing. The H-arm is suitably terminated in a non-reflective or impedance matching termination 209.

Side arms 210 and 211 of junction 208 are connected respectively by coaxial cables 212 and 213 to crystal diodes 214 and 215 respectively in side arms 216 and 217 respectively of a magic-T 218. This magic-T and the remainder of the components of the system of FIG. 2 still to be described are designed for operation at the control input frequency $f$. However, the diodes 214 and 215 receive waves at the second harmonic $2f$ of the control input frequency.

Assuming that the diodes 214, 215 are of equivalent electrical distances from the center of magic-T 218, it is required that they be operated so that the previously mentioned wave of frequency $2f$ is applied to them in phase opposition. That is, when one diode is rendered more conductive the other diode is rendered less conductive, and vice versa. This requirement is met if side arms 210, 211 are of equivalent electrical length, coaxial cables 212, 213 are of equivalent electrical length, and if diodes 214, 215 are of like polarity as shown in FIG. 2. The required phase opposition is then produced because the input of magic-T 208 is applied to its E-arm. Many equivalent arrangements are possible. For example, diodes 214, 215 may be of opposed polarities, in which case either the cables 212, 213 may differ in electrical length by one-half wavelength, or the input to magic-T 208 may be applied to its H-arm, etc.

The waveguide system 219 with the components inserted therein constitutes a carry loop which operates as a memory device. In the system shown, this device regenerates and stores a wave representative of the necessary carry digit.

The H-arm of the magic-T 218 is connected to a waveguide system 219, in which are inserted in tandem a variable attenuator 220, a band-pass filter 221 designed to pass the control input frequency $f$, a traveling-wave-type amplifier 222, a magic-T 223, a variable attenuator 224, and a directional coupler 225, connected in a loop arrangement, in the order stated, as shown. The amplifier 222 has a limiting or saturating characteristic.

The H-arm of the magic-T 223 is provided with a non-reflective termination 226.

The magic-T 218 and its associated components function as a balanced modulator for producing a wave of frequency $f$ under the control of a wave of frequency $2f$. The frequency $2f$ is applied to the modulator by means of the crystal diodes 214, 215 in the side-arms of the magic-T, while the frequency $f$ is present in the waveguide system 219. The phase of the wave of frequency $f$ in the loop can assume either of just two possible values, differing by substantially 180 degrees. Application of a wave of the control input frequency having one of the permissible phases of the loop and of sufficient amplitude will cause the wave in the loop to conform to the phase of the applied wave. When the wave in the loop has changed its phase in conformity with the applied wave, the phase in the loop will continue constant under the control of the modulator even though the applied wave which determined its phase may subsequently be removed. The phase in the loop will persist until an over-riding wave of the other permissible phase is applied.

In the system of FIG. 2, the phase-determining wave is applied to the loop by means of the directional coupler 225. If desired, a properly matched T junction may be used in place of a directional coupler at this and various other places where a directional coupler is shown. The nature of the phase-determining wave is in turn determined by input waves A and B, of substantially equal amplitudes, applied respectively to side arms 227 and 228 of a magic-T 229 the H-arm of which is connected to a waveguide system 230 including, if desired, a variable attenuator 231, and connected to the carry loop through the directional coupler 225. The E-arm of the magic-T 229 is provided with a reflectionless termination 232.

In the present illustration, input waves A and B each represent in coded form a binary digit, which binary digits are to be added together. A digit one is represented by a wave the phase of which is one of the permissible phases of the carry loop and a digit zero is represented by a wave the phase of which is the other permissible phase of the carry loop.

In other illustrative embodiments of the invention the input waves may represent a wide variety of other types of information.

The remainder of the system of FIG. 2 to be described functions to compare the phase of the input wave A with the phase of the input wave B and on the basis of this comparison to perform the logical operation of determining whether the final sum digit is to be the same or different from the digit represented by the wave in the carry loop. If the sum digit is the same as the carry digit, a wave from the carry loop is transmitted into the output of the system without phase change, to represent the final sum digit. If the sum digit is different from the carry digit, a phase reversal is impressed upon a wave taken from the carry loop and this phase-reversed wave is transmitted into the output of the system to represent the final sum digit, all according to the rules of addition hereinabove set forth.

Input wave A is applied to the H-arm 233 and the input wave B to the E-arm 234 of the magic-T 235. These two input waves are of substantially equal amplitudes at these points. Side arms 236 and 237 contain respectively crystal diode detectors 238 and 239. These two detectors are located at equivalent electrical distances from the center of magic-T 235 and are preferably matched to each other and they are connected in opposite polarity. Each detector in the presence of an alternating electromagnetic wave of whatever phase produces a current in the direction in which the detector is conductive. The detector currents are carried by coaxial cables 240 and 241 respectively to crystal diodes 242 and 243 respectively located in the side arms 244, 245 of a magic-T 246. Detector current from diode 238 flowing through diode 242 will modify the wave reflective qualities of the arm 244 and detector current from diode 239 flowing through diode 243 will modify the wave reflective qualities of the arm 245, so that one or the other of the two permitted phases predominates in the resultant reflected wave.

The carry wave from the carry loop is transmitted through one side arm of the magic-T 223 and through an isolator 247 into an arm, here the H-arm, of the magic-T 246. The remaining arm 248 of the magic-T 246, here the E-arm, is used to transmit the output sum wave away from the system to be utilized elsewhere as desired.

As far as the operation of the magic-T 246 is concerned, the input to the H-arm may be regarded as a wave of fixed phase.

The system of FIG. 3 is similar in many respects to those of FIGS. 1 and 2, with the addition of illustrative input number generating means, output phase determining means, and power distribution means. The system of FIG. 3 also includes a number of alternative arrangements at various points in the system.

The system of FIG. 3 is divided into seven functional portions by means of broken lines in the drawings, for the sake of clarity and convenience in the description. A power distribution portion 300 and a second-harmonic generator 301 are shown in FIG. 3A. Input number generators 302 and an input network 303 are shown in FIG. 3D. A carry loop 304 and a binary adder 305 are shown in FIG. 3B, and an output phase determining means 306 is shown in FIG. 3C. Output pulses are made available in means 306 for transmission to a printing-out device or other desired means (not shown) for utilizing the output of the complete system.

The power distribution portion 300 supplies electromagnetic waves of substantially sinusoidal waveform and fixed reference phase. It supplies these waves to the second harmonic generator 301, to operate that generator, to the input number generators 302 wherein the supplied waves may be phase-modulated to represent any numbers which it is desired to add together, and to the output phase determining means 306 to effect phase demodulation of phase-modulated output waves from the binary adder 305.

The second harmonic generator 301 exercises control over the carry loop 304 constraining the loop to operate exclusively in one or the other of two substantially opposite phases, representing carry digits one and zero, respectively.

The input number generators 302 receive two waves from the power distribution means. In the input number generators each of these waves is independently phase modulated to give a phase-modulated wave A representing a succession of augends, say, to be used in successive stages of addition, and a phase-modulated wave B representing a successtion of addends. The succession of augends may represent in order the right hand digit of a binary number, the next digit to the left in that same binary number, the following digit to the left, and so on, until the whole binary number has been included digit by digit. Following the first number there may be another succession of augends representing the successive digits of another binary number which is to be the augend in a second adding operation. The succession of addends represented by phase-modulated wave B may represent in succession the successive digits of the addend which is to be added to the first augend, followed by the addend which is to be added to the second augend, and so forth.

The input network 303 as shown performs two main functions upon the phase-modulated waves A and B which it receives from the input number generators 302. One function is to obtain the algerbraic sum of the waves A and B and pass the result to the carry loop 304 to aid in determining the carry, if any, to the succeeding stage of the addition. The waves A and B are preferably adjusted to substantially equal amplitude say E, before the algebraic addition is performed, so that the phase of each of these waves is then identifiable as either +E or −E. Accordingly the algebraic sum of the waves A and B passed to the carry loop as a control wave is always substantially either +2E, 0, or −2E. At the instant when this control wave is applied to the carry loop the wave existing in the carry loop may be of either phase, viz., +E or −E.

TABLE 2

| Input Sum of wave A and wave B, without taking account of carry | Input Voltage Sum, without taking account of carry | Desired Carry Voltage | |
|---|---|---|---|
| | | Previous Carry=−E | Previous Carry=+E |
| 0 | −2E | −E | −E |
| 1 | 0 | −E | +E |
| 2 | +2E | +E | +E |

Table 2 shows that the phase of the carry output voltage desired in the succeeding stage of addition can be obtained from the rule that the phase of the desired carry voltage is the same as the phase of the input voltage sum without taking account of carry, unless that sum is equal to zero. If the sum, second column of Table 2, is zero, the phase of the carry to the succeeding stage is the same as the carry from the preceding stage. Table 2 contains some of the same information given in Table 1 but stated in terms of the voltages of the waves A and B and of the carry voltages.

The control wave is added algebraically to the carry wave in the carry loop, with the result that a control wave of amplitude +2E gives a positive result regardless of which phase existed in the carry loop, causing the regenerated wave in the carry loop to continue in the +E-phase if that phase existed, or to begin to change over to the +E-phase if the existing phase was −E. Similarly, a control wave of −2E has an over-riding effect to compel the carry loop either to persist in the −E-phase or to begin to change over to that phase if the existing phase was +E. If on the other hand the control wave is of substantially zero amplitude, then the input network exerts no control over the carry loop and the latter persists in whichever phase it happened to have when the control wave amplitude went to zero. In this manner the rule for the carry is followed. The second function of the input network as shown is simply to pass along the phase modulated waves A and B to the binary adder.

The binary adder 305 functions to determine the final sum digit for the given stage of the addition process and pass the result along to the output phase determining means 306. As shown, the binary adder also passes the carry wave along to the output phase determining means where the value of the carry digit may be determined and utilized if desired. It will be noted that for the usual purposes of addition the final sum is all that is desired and the value of the carry digits will generally be of no interest. For monitoring, however, the value of the carry may be of interest.

TABLE 3

| Input Sum of wave A and wave B, without taking account of carry | Input Voltage Sum, without taking account of carry | Desired Final Sum Voltage | |
|---|---|---|---|
| | | Previous Carry=−E | Previous Carry=+E |
| 0 | −2E | −E | +E |
| 1 | 0 | +E | −E |
| 2 | +2E | −E | +E |

Table 3 shows that the phase of the final sum output voltage may be obtained from the rule that the phase of the final sum voltage is the same as the phase of the carry from the preceding stage, unless the input voltage sum is zero. If the sum is zero, the phase of the final sum voltage is opposite to the phase of the carry from the preceding stage. Table 3 contains some of the same information given in Table 1 but stated in terms of the voltages of the waves A and B and of the desired final sum voltage.

The function of the binary adder in the embodiment illustrated is to sense the algebraic sum of waves A and B as to whether that sum is 0 or ±2E. If the sum is ±2E, the binary adder passes a portion of the carry wave on to the output phase determining means without alteration of the phase of the carry wave, for in this case the sum digit is always the same as the carry digit from the preceding stage. If, on the other hand, the sum is 0, the binary adder obtains the reverse of the phase of the carry wave and passes the reversed-phase wave to the output phase determining means to represent the final sum digit.

It is not necessary in this adder that the waves A and B and the carry wave C be combined in any given order. That is, for example, the carry wave could be inserted wherever input A appears in the figures and input A could be inserted wherever there is a carry input shown. In general A, B and C may be permuted as desired.

The output phase determining means 306 functions to compare the phase of a wave received from the binary adder 305 with a wave of the fixed reference phase from the power distribution portion 300 to give a detected pulse signal indicative of either a digit one or a digit zero, as the case may be.

It will be noted that the final sum digit of a given stage of addition should be determined before the phase of the carry loop has changed. This is because the final sum digit is determined in part by the carry from the preceding stage and does not depend upon the carry to the succeeding stage. The time intervals required to calculate the final sum and to determine the new carry to the succeeding stage will determine the total time interval that must elapse between the start of one addition stage and the start of the next addition stage. Suppose T1 is the time required for the system to determine the sum and T2 the time required for the system to determine the carry to the succeeding stage and to change over the phase of the regenerated wave in the carry loop. Then the time required for completion of a given stage of the addition will be at least as great as the larger of the two quantities T1 and T2. In case T2 should be less than T1, delay will have to be introduced in the carry loop to prevent the carry from changing phase before the old carry has served its purpose in the determination of the final sum.

The wave phases may be adjusted initially in the various parts of the system by adjusting the lengths of the transmission lines or waveguides or by use of adjustable phase shifters inserted in the transmission paths as needed.

The components of the system of FIG. 3 comprise rectangular waveguide, coaxial waveguide or coaxial cable, variable or adjustable attenuators, isolators, crystal diodes, crossguide directional couplers, adjustable phase shifters, hybrid waveguide junctions or magic-T's, waveguide tuners, traveling-wave-tube amplifiers, band-pass filters, etc., all adapted for convenient and efficient interconnection in a microwave system.

*Power distribution means (FIG. 3A)*

The prime source of waves for the system of FIG. 3 is a generator 310, preferably relatively stable in frequency and power output. The power output may be continuous or it may be in the form of pulses of continuous waves. The generator 310 is connected through rectangular waveguide and through an isolator 311 to a crossguide directional coupler 312. One cross arm of the coupler 312 is reflectionlessly terminated at 313 while a small amount of power is diverted into the other cross arm to a wavemeter 314 and a crystal diode 315 for monitoring purposes. The coupler 312 is connected for direct transmission into a coaxial waveguide 316 which is connected to the E-arm, so marked, of a magic-T 317, the H-arm of which is also marked in the drawing and is reflectionlessly terminated. In the drawings, the E-arm is always the arm shown opposite the H-arm. One side arm of the magic-T 317 is connected by coaxial cable to the second-harmonic generator 301 and the other side arm is connected by rectangular waveguide to the E-arm of a magic-T 318. The side arms of the magic-T 318 connect to the H-arms respectively of magic-T's 319 and 320. One of the side arms of magic-T 319 connects through a variable attenuator 321 to the input number generators 302 and the other side arm is connected through a variable attenuator 322 to the output phase determining means 306. Similarly, one of the side arms of magic-T 320 connects through a variable attenuator 323 to the input number generators 302 and the other side arm is connected through a variable attenuator 324 to the output phase determining means 306.

After the coupler 312 leads off a small amount of power for monitoring, the main power divides approximately in two equal parts in magic-T 317, one half going to the second-harmonic generator to control that generator. The other half of the power is divided by magic-T's 318, 319 and 320 into four substantially equal portions, two of which are transmitted to the input number generators and two to the output phase determining means.

*Second-harmonic generator (FIG. 3A)*

The input wave for the second-harmonic generator 301 comes over the coaxial cable from one side arm of magic-T 317 in the power distribution means 300 and is applied through an isolator 330, coaxial tuners 331 and 332 to a diode 333, in one arm of an E—H tuner 334, of which tuner two other arms are adjustable and the fourth arm is connected to the E-arm of a magic-T 335. The subsystem 333, 334, 335, is designed for operation at the second-harmonic frequency so that in general the linear dimensions of the rectangular waveguides in this subsystem will be approximately one half the corresponding linear dimensions of the rectangular waveguides used elsewhere in the system. The side arms of the magic-T 335 are connected by coaxial cables to the carry loop 304.

The second-harmonic generator functions in conventional manner to set up waves of frequency $2f$ in the subsystem 333, 334, 335 in response to waves of frequency $f$ set up in the diode 333.

*Input number generators (FIG. 3D)*

A magic-T 340 receives in its H-arm an input wave over a coaxial cable from the variable attenuator 323 in the power distribution means 300 and another magic-T 341 receives in its H-arm an input wave over a coaxial cable from the variable attenuator 321. Synchronously operable pulse generators 342 and 343 are provided which may be independently keyed or otherwise controlled to produce trains of pulses representative of numbers in binary notation which are to be added by the system. Pulses from generator 342 are transmitted by coaxial cables to oppositely poled diodes 344, 345, in the respective side arms of the magic-T 340, producing a phase modulation of the initially unmodulated wave impressed upon the H-arm from the power distribution means, the phase-modulated wave comprising the wave A, for example, and being transmitted through a traveling-wave-tube amplifier 346 to the input network 303. Alternatively, the input waves from the power distribution means 300 may be pulses of continuous waves. The amplifier 346 may be of a type that is capable of adjusting both the amplitude and the phase of the amplified wave within certain limits. Pulses from generator 343 are similarly transmitted to oppositely poled diodes 347, 348, in magic-T 341 to produce a second phase-modulated wave B, for example, which is transmitted through a traveling-wave-tube amplifier 349 to the input network 303.

As shown in the figure, the system employs a positive pulse to represent a digit one and a negative pulse to represent a digit zero. Alternatively, it is feasible to use the presence of a pulse to represent a digit one and the absence of a pulse to represent a digit zero. A sequence of plus and minus pulses may be converted into a sequence of pulses and spaces, or vice versa, by introducing a suitable biasing potential.

*Input network (FIG. 3D)*

The input network 303 receives an input of phase-modulated wave A from the output of the amplifier 346 of the input number generators by coaxial cable to the H-arm of a magic-T 360 and an input of phase-modulated wave B from the output of the amplifier 349 by coaxial cable to the H-arm of a magic-T 361. Alternatively, input phase-modulated waves A and B may be generated by any known means and introduced directly into the input network 303 over coaxial cables 432 and 433, respectively, in which case the input number generators 302 may be omitted. The waves A and B may come, for example, from registers in a computer. The side arms of the magic-T's 360 and 361 are connected respectively to the side arms of a magic-T 362. The output from the H-arm of the magic-T 362 is transmitted through a monitoring crossguide directional coupler 363 and a rectangular waveguide 364 to the carry loop 304. The remaining side arms of the magic-T's 360 and 361 are connected respectively to points in the binary adder 305.

Modulated waves A and B are added algebraically in magic-T 362, giving either no output wave (substantially 0) or a wave of amplitude and phase representable by +2E, or else a wave of substantially the same amplitude and opposite phase, representable by —2E. Modulated waves A and B are transmitted through magic-T's 360 and 361 respectively with substantially no change in amplitude or phase. Provision may be made at this point, however, for correction of wave amplitude and phase by means of a variable attenuator 365 and a variable phase shifter 366 in one of the transmission paths, for example in the path from magic-T 361 to the binary adder 305.

*Carry loop (FIG. 3B)*

The carry loop receives second-harmonic input waves of frequency 2*f* from the second-harmonic generator over coaxial cables which lead to diodes 370 and 371 respectively. The carry loop also receives an input wave from waveguide 364 at the fundamental frequency *f* from the input network 303. The waves of frequency 2*f* and *f* are mixed in the system comprising the diodes 370, 371 and a magic-T 372 in the side arms of which the diodes are located, the diodes being alike in the embodiment illustrated. As discussed hereinabove in connection with magic-T 208 in FIG. 2, various alternative arrangements are available. The waves of frequency *f* are led into the magic-T 372 by means of a crossguide directional coupler 373 and a variable attenuator 374. Slide-screw tuners 375, 376 may be provided in the side arms of the magic-T 372 as shown. The output of the magic-T 372 is delivered through its H-arm into a variable attenuator 377 followed by a band-pass filter 378 passing the *f* frequency to the exclusion of 2*f* and other unwanted frequencies. The carry loop system continues on from the filter 378 through a traveling-wave-tube amplifier 379, a magic-T 380 and a variable attenuator 381 to complete the loop at the magic-T 373. A carry output wave is taken from one side arm of the magic-T 380 and led by coaxial cable to the binary adder 305.

*Binary adder (FIG. 3B)*

The binary adder receives phase-modulated waves A and B from magic-T's 360 and 361 respectively in the input network 303 and applies them to the H-arm and the E-arm respectively of a magic-T 390, a variable attenuator 391 being included in the path from magic-T 360. A diode 392 is provided in one side arm of magic-T 390 and a diode 393 of opposite polarity to diode 392 is provided in the other side arm of the magic-T. When the wave A and the wave B are applied to the magic-T 390 and the two waves are of the same phase, a wave of substantially the same amplitude compared to either A or B appears in one side and substantially no response appears in the other side arm, producing a rectified current in one diode, say 392, the direction of which is the same regardless of the actual phases of waves A and B as long as the two phases are the same. If, on the other hand, the waves A and B are of opposite phases, a wave appears in the second-mentioned side arm and substantially no wave appears in the first-mentioned side arm, so that in the diode 393 there is produced a rectified current, the direction of which is determined by the polarity of the diode 393 and again is substantially independent of the actual phases of the waves A and B as long as the two phases are opposite.

Rectified currents are carried from diode 392 by a coaxial cable 394 to a diode 395 in one of the side arms of a magic-T 396. Another coaxial cable 397 carries rectified currents from diode 393 to a diode 398 in the other side arm of magic-T 396. A balancing effect may be obtained by joining the coaxial cables 394 and 397 to a cross-connecting cable 399, if desired, and monitoring of the rectified current system may be obtained in a branch coaxial cable 400.

The balanced modulator comprising the magic-T 396 and the crystal diodes 395, 398, operates by virtue of the reflection of waves from a crystal diode when an impedance mismatch occurs in the magic-T due to the flow of current in the diode. The phase of the reflected waves emerging from the magic-T depends upon the relative mismatches of the two diodes.

A carry wave from the carry loop is transmitted to the H-arm of magic-T 396 through an isolator 401, a crossguide directional coupler 402, and a variable attenuator 403. When the balance of the magic-T 396 is disturbed by the presence of rectified currents from the cables 394, 397 in the diodes 395, 398, the phase of the output wave transmitted to the E-arm is determined. The phase of the output wave will either be substantially the same as the phase of the carry wave or it will be substantially in phase opposition to the phase of the carry wave. The output wave from the E-arm of magic-T 396 is delivered by coaxial cable to the output phase determining means 306 and represents the final sum digit corresponding to the addition of the digits represented by the phase-modulated waves A and B. A portion of the energy of the carry wave is diverted by the crossguide directional coupler 402 and is led by coaxial cable to the output phase determining means.

*Output phase determining means (FIG. 3C)*

The output phase determining means 306 is a system employing two phase modulation detectors, each comprising a magic-T and two diodes. The phase-modulated wave from the magic-T 396 in the binary adder, which wave represents the final sum digit, is impressed upon the E-arm of the magic-T 410 through an adjustable phase shifter 411. A wave of fixed or reference phase from the power distribution means 300 is impressed upon the H-arm of the magic-T 410. Oppositely poled diodes 412, 413 in the side arms of the magic-T produce a rectified current in the coaxial cable 414 when the sum wave is in the same phase as the wave of reference phase and no rectified current when these two waves are in opposite phase to each other. Magic-T 420 and diodes 422, 423, function similarly to compare the phase of the carry wave with the wave of reference phase.

If desired, the high frequency output waves developed in the binary adder, representing the binary sum, and shown as transmitted over a coaxial cable 430 in FIG. 3C, as well as the high frequency output waves representing the carry, and shown as transmitted over a coaxial cable 431 in FIG. 3C, may be fed to suitable utilization devices directly without reduction to direct current pulses, in which case the output phase determination means 306 may be omitted.

The limiting factor in the speed of operation of the system of FIGS. 1, 2, or 3, may be the delay time in the amplifier and circuit comprising the carry loop. Since the calculation of the carry in each stage of computation may be affected by the result of the carry calculation in the preceding interval, the total time required for a logical decision, in this case the delay time of the carry loop, determines the minimum bit interval which can be used. It is advantageous that the carry amplifier be able to accommodate phase changes of 180 degrees within the time of a few cycles, and consequently that it have a broad frequency band of amplification, a feature which is found, for example, in amplifiers of the traveling-wave-type. This type amplifier is also advantageous in the system disclosed, because of the nature of its saturation or limiting characteristic. Other types of amplifiers may however be used.

Reverting to the system of FIG. 2, the logical operation of the system is shown diagrammatically by FIG. 4. This figure shows inputs A and B each applied to two branching paths. The right-hand branch contains a logic circuit of the Exclusive Or type giving a result in the form of an output D. The left-hand branch contains means for developing a wave F which represents the algebraic sum of a voltage +E from A and a voltage +E from B. Thus, F may represent +2E, 0, or —2E. The wave F controls the regenerative carry circuit to change the phase of the carry wave whenever a change is required. C represents the carry from the preceding stage of the calculation and C′ represents the carry to the succeeding stage. Wave C forms the input to a reversing switch type of device under the control of wave D. The output is either the same as the wave C or it is a wave of phase opposite to the phase of wave C, depending upon the phase of the wave D, thus giving as a result the final sum digit S which takes into account the carry from the preceding stage. After the change, if any, in the carry, the output wave C′ from the carry loop may be taken off for use in a succeeding stage or it may simply become the C in the next stage of addition to determine the next value of S.

TABLE 4

| C | A | B | S | C′ | D Exclusive or of A and B | S Exclusive or of C and D | F Algebraic Sum of A and B | C′ Carry Loop Changed Compared to C |
|---|---|---|---|---|---|---|---|---|
| − | − | − | − | − | − | − | −2E | No |
| − | − | + | + | − | + | + | 0 | No |
| − | + | − | + | − | + | + | 0 | No |
| − | + | + | − | + | − | − | +2E | Yes |
| + | − | − | + | − | − | + | −2E | Yes |
| + | − | + | − | + | + | − | 0 | No |
| + | + | − | − | + | + | − | 0 | No |
| + | + | + | + | + | − | + | 2E | No |

Table 4 sets forth the detailed operation of the system of FIG. 4 in tabular form.

FIG. 5 shows the system of FIG. 4 in more concise form. The overall function of the right-hand path in FIG. 4 is to determine the final sum digit S taking into account C from the left-hand path. The function of the left-hand path is to determine the carry and supply it to the right-hand path for use in the determination of S. C′ may be utilized separately if desired, as for example, in parallel addition.

Referring again to FIG. 2, it will be observed that the magic-T 218, along with its associated waveguide loop, including the amplifier 222, and along with crystal diodes 214 and 215, and their input circuit, serve as memory apparatus, having two input terminals and one output terminal. Thus the waveguide 205 may be regarded as one input terminal through which a wave of frequency $2f$ is applied; the waveguide 230 may be regarded as another input terminal through which an input wave of frequency $f$ is applied; and the waveguide leading to the isolator 247 may be regarded as the output terminal, through which a wave of frequency $f$ leaves the memory apparatus. As previously stated, this memory apparatus is regenerative in nature, and is adapted to maintaining oscillations capable of assuming either one of two stable phase conditions. A characteristic of the apparatus is that the phase condition of the oscillations, once established, persists until a phase-modulated wave of a different phase and of over-riding amplitude is impressed upon the apparatus, through the waveguide 230. Assuming, for example, that the oscillations in the region of the directional coupler 225 are of a given phase, this condition will be maintained if the incoming wave from the waveguide 230 is in phase with these oscillations, or if it is out of phase with them but of small amplitude. However, when the incoming wave is out of phase with the oscillations and greater than a critical value, the result will be to switch the oscillations in the memory apparatus over to the new phase condition, opposite to the one previously existing.

In analyzing this action, one may note that, the circuit being regenerative, the amplitude of the output from the directional coupler can affect the amplitude of the wave fed back to it. However, this action depends partly upon the particular amplitude of the control wave applied to the directional coupler through the waveguide 230. Thus if the oscillations within the loop are initially large enough to cause the amplifier 222 to limit, a wave of small amplitude applied through the waveguide 230, even if of a phase to subtract from the existing oscillations in the region of the directional coupler, may have so small an effect that the amplitude of the oscillations is still great enough to cause the amplifier 222 to limit, and hence may leave unchanged, or substantially unchanged, the amplitude of the output from this amplifier. Thus the amplifier is insensitive to amplitude variations at its input, in this range. A larger control wave from the waveguide 230, however, can subtract from the existing oscillations enough so that the amplifier 222 temporarily no longer limits, and then the amplitude of the output from the directional coupler 225 has a very perceptible effect on the amplitude of the wave fed back to it.

Where there is a limiting device, such as the amplifier 222, in the loop, insensitive to amplitude variations in a certain range, the amplitude of the control wave applied through the waveguide 230 needed in order to reverse the phase of the oscillations is greater than, and preferably much greater than, enough to produce, at least temporarily, a net oscillation of such amplitude that the amplifier or other limiting device is temporarily no longer in its limiting condition.

It will also be noted here, that, because of the regenerative action of the apparatus, it is not absolutely necessary under all conditions that in order to have an over-riding effect the control wave applied from the attenuator 231 to the directional coupler, be greater in amplitude than the previously existing oscillations within the loop. However, the larger the amplitude of the control wave (within limits), the quicker it can reverse the phase of the existing oscillations. Hence in the preferred embodiment, for reversing the phase, there is employed a control wave large enough so that it is greater than, and preferably much greater than, the previously existing oscillation at the point where one is subtracted from the other. This provides a fast switching action, as normally desired.

The apparatus may employ memory apparatus other than that illustrated.

For example, it may employ other regenerative memory apparatus including a first input terminal to which a wave of frequency $nf$ is applied, a second input terminal to which a wave of frequency $f$ is applied, and an output terminal at which there appear oscillations the phase of which is controlled by a wave applied to the second input terminal. In a binary system, it is preferable that $n=2$. Illustrative regenerative circuits used in the memory apparatus may employ non-linear devices of the crystal diode type or other non-linear devices, for example, ferrites.

From the description of the operation of the illustrative system it will be understood that there are definite advantages in using, in the system, memory apparatus which maintains output oscillations which tend to be stable in phase, but which is capable of changing the phase of the output oscillations in response to a change in phase of an input control wave of large amplitude, but not of small amplitude. Thus the system as a whole takes advantage of the characteristic of the apparatus that, so long as the amplitude of the input control wave remains below a critical value, the apparatus is not sensitive to changes in the phase of that control wave, but a control wave of amplitude greater than that critical value is capable of switching the oscillations to a different phase.

While the systems illustrated are designed particularly for the microwave frequency region because of the advantage in operating speed obtained in that region as compared to lower frequencies, no restriction to any particular frequency region is to be implied. In other frequency regions, various means are available for combining phase-modulated waves in a manner analogous to the operation of the magic-T's, directional couplers, etc., commonly employed in the microwave frequency region. For example, at lower frequencies hybrid coils, balanced modulators employing transistors, vacuum tubes, diodes, etc. may be used.

The invention is not to be construed as being limited to computing systems nor to addition. The means disclosed for performing various logical operations are also applicable to other and different modes of combining information to obtain a result according to some suitable rule of combination. For example, binary digits may be combined by multiplication in accordance to rules suitable to binary multiplication. It will be noted, for example, that the product of two binary digits may be found by means of the two-input AND operation. The rule here is that the product of two binary digits is one only if both of the digits are ones.

Furthermore, the memory circuit disclosed herein for retaining or changing the value of the carry is applicable generally where the memory function is required, in information handling generally or more specifically in controlling and programming a computer. However, in systems of the type herein disclosed, this memory circuit has unique advantages.

Also, the circuits disclosed for performing logical operations are of general application in information-handling systems.

While an illustrative form of apparatus and a method in accordance with the invention have been described and shown herein, it will be understood that numerous changes may be made without departing from the general principles and scope of the invention.

1. In combination, sources of phase-modulated input waves respresenting information to be combined in accordance with a given rule, means for sensing the phases of said phase-modulated waves, memory apparatus comprising regenerative means for establishing oscillations, means connected to said sources of input waves for controlling said memory apparatus in accordance with the phases of said input waves, and output means connected to said phase sensing means and to said memory apparatus for producing an output wave and for controlling the phase thereof in accordance with the relative phases of said oscillations and of said input waves, whereby said output wave indicates by its phase the result of combining said information in accordance with a given rule.

2. Apparatus according to claim 1, including means for applying to said regenerative means a wave, constant in phase, for restricting said oscillations to one of two phase conditions differing by substantially 180 degrees.

3. Apparatus according to claim 1, in which said regenerative means comprises means forming a loop, including input means for said loop, modulating means, microwave guiding means, and output means for said loop, connected in series relation, for storing phase-modulated waves.

4. Apparatus according to claim 1, in which said memory apparatus is adapted to maintain phase-stable oscillations and has a reaction time great enough to prevent it from changing the phase of its said oscillations until after said output wave has indicated by its phase a value representative of the result of the combining of the information in a given operation, said memory apparatus being thereafter able to change the phase of its oscillations to a new stable value for use in a subsequent operation.

5. In memory apparatus, in combination, a regenerative loop, means to establish in said loop oscillations of constant frequency capable of assuming selected stable phase conditions, said phase conditions tending to persist due to the regenerative nature of the loop until an overriding wave is impressed upon the loop, and means to impress upon said loop a phase-modulated wave of overriding amplitude with respect to the oscillations existing in the loop and of different phase condition, to thereby cause the phase conditions of said oscillations in said loop to conform to those of the said impressed phase-modulated wave.

6. Apparatus for combining binary digits according to a given rule of combination, comprising a plurality of translating means for translating the binary digits to be combined respectively into a plurality of phase-modulated waves of one or the other of two materially different phases representing a digit "one" and a digit "zero" respectively, means for sensing the phases of said phase-modulated waves, and means connected to said sensing means for controlling the phase of a third-modulated wave in accordance with the output from the said sensing means, to indicate by the phase of said third wave the binary digit which results from combining the given binary digits according to the given rule.

7. Apparatus for addition of two given binary digits, comprising a plurality of translating means for translating the given digits into phase-modulated waves of one or the other of two materially different phases representing a digit "one" and a digit "zero" respectively, means for comparing the phases of the said phase-modulated waves, and means connected to said phase comparison means for controlling the phase of a third phase-modulated wave in accordance with the output from said phase comparison means, to indicate by the phase of said third wave the binary digit which results from adding the given binary digits.

8. Apparatus for binary full addition, comprising a plurality of translating means for translating successions of given binary digits into phase-modulated waves in accordance with a code in which the digit "one" is represented by one phase in the phase-modulated waves and the digit "zero" is represented by a materially different phase therein, means for regeneratively producing a carry wave, means for phase-modulating said carry wave to represent the carry from the preceding stage of addition as a digit "one" or a digit "zero" according to the said code, means for comparing the phases of the phase-modulated waves representing two digits to be added in the instant stage of addition, means for controlling the phase of an output wave to be like or unlike the phase of the said carry wave in accordance with the result of the said phase comparison to indicate by the phase of said output wave the required final sum digit in the instant stage of addition taking into account the carry from the preceding stage, and means thereafter for changing the phase of the carry wave or not, as required by the result of the said phase comparison, to make the phase of the carry wave represent the carry digit required to be carried to the succeeding stage of addition.

9. In memory apparatus, in combination, a regenerative loop, said loop including means having opposed surfaces for guiding electromagnetic waves along a patch between said surfaces, means to establish circulatory oscillatory waves in said loop, said loop being adapted to maintain said oscillations therein at constant frequency throughout the operation of said loop and to control them so that they are capable of assuming selected stable phase conditions, said loop including input control means controllable by a phase-modulated wave impressed thereon to initiate changes in said loop to cause the oscillations therein to conform to the phase conditions represented by the said impressed wave, said loop being adapted to maintain the resulting phase conditions of the oscillations therein, due to the regenerative nature of the loop, until such time as a phase-modulated wave of different phase condition and of over-riding amplitude is impressed upon said control means, and output means connected to said loop, whereby information represented by the phase conditions of said phase-modulated input wave may be stored by the circulating oscillations in said loop.

10. Apparatus according to claim 9, in which said loop includes a balanced modulator, and means connected to said balanced modulator for applying a wave to the same.

11. In apparatus for handling information, in combination, an amplifier, means connecting the output of said amplifier to its input so as to form a regenerative loop capable of maintaining circulating waves, means for applying a reference wave to said loop so as to cause said circulating waves to be stable at a frequency related to the frequency of said reference wave, output means coupled to said loop means, and input means coupled to said loop means for applying thereto a wave having one or another of a selected plurality of stable phase conditions, and of over-riding amplitude with respect to the circulating waves in said loop, for storing information in said loop in the form of phase conditions of said circulating waves therein.

12. Apparatus according to claim 11, in which said means for applying said reference wave to said loop includes magic-T means.

13. In memory apparatus, a regenerative loop capable of sustaining microwave oscillations stable in frequency and having two stable phase conditions, said loop including: means having opposed, spaced apart, metallic surfaces for guiding microwaves so that they travel along an elongated path, an amplifier, input means connected to said loop at a station for coupling into said loop an information-bearing input wave of over-riding amplitude with respect to said oscillations, said input wave being phase modulated so that at any given moment when it is applied to said loop, it is substantially in phase with or 180° out of phase with respect to the oscillations then existing in said loop at said station, whereby said input wave is capable of storing information in said loop by controlling the phase conditions of said waves traveling in said loop, and output means coupled to said loop.

14. Apparatus according to claim 13, including non-linear impedance means, means coupling said non-linear impedance means to said loop, and means for applying a reference wave to said non-linear impedance means.

15. In memory apparatus, a regenerative loop capable of sustaining phase modulated electromagnetic carrier waves of stable frequency in at least two stable phase conditions, said loop including: means for guiding said waves along a path, amplifying means, input means connected to said loop at a station for coupling into said loop an information-bearing input wave of over-riding amplitude with respect to the waves in said loop, said input wave being phase modulated so that at any given moment when it is applied to said loop, it is substantially in phase with or 180° out of phase with respect to the oscillations then existing in said loop at said station, said input wave acting to phase modulate the waves in said loop in like phase with said input wave, whereby said input wave is capable of storing information in said loop.

16. In memory apparatus, a loop including: means having opposed, spaced apart, metallic surfaces for guiding microwaves so that they travel along an elongated path, an amplifier, wave regenerating means responsive to the phase of a wave impressed thereon to produce an output wave of stable frequency having one or two stable phase conditions depending upon the phase of said impressed wave; input means connected to said loop at a station for coupling into said loop an information-bearing input wave of over riding amplitude with respect to the output wave from said regenerating means, said input wave being phase modulated so that at any given moment when it is applied to said loop, it is substantially in phase with or 180° out of phase with respect to the waves then existing in said loop at said station, whereby said input wave is capable of storing information in said loop, and output means coupled to said loop.

17. In apparatus for handling information, in combination, a plurality of translation means for translating items of information into respective phase-modulated waves, a first phase comparision means for comparing the phases of said phase-modulated waves and for producing a first control signal, a second phase comparison means for comparing the phases of said waves and for producing a second control signal, means connected to said second phase comparison means and controlled by said second control signal for producing and maintaining oscillations, and output means connected to said last-mentioned means and to said first phase comparison means for producing an output wave and for controlling the phase of said wave in accordance with said first control signal and said oscillations, so as to produce a phase-modulated wave representative of the result of combining the said information in accordance with a given rule.

18. In apparatus for handling information, in combination, sources of phase-modulated input waves representing information to be combined in accordance with a given rule, output means including phase sensing means connected to said sources, memory apparatus comprising regenerative means for establishing oscillations having either of two stable phase conditions and for maintaining said oscillations stable in phase until a wave of over-riding amplitude and different phase is impressed upon said memory apparatus, means for controlling said memory apparatus connected to said sources of input waves for comparing said input waves with each other in phase and, in accordance with the result of said phase comparison, for controlling the phase of said oscillations by impressing on said memory apparatus a phase-modulated wave of over-riding amplitude with respect to the oscillations existing therein, and means for applying said oscillations to said output means, said output means being adapted to produce an output wave at an output point and to control the phase of said output wave in accordance with the relative phases of said oscillations from said memory apparatus and said input waves from said sources, to indicate thereby the result of combining the said information in accordance with said given rule.

19. A computing system for combining binary digits according to a given rule of combination, said system comprising sources of first, second and third unmodulated waves of substantially fixed frequency, phase and amplitude; first, second and third phase-modulating means operable upon said respective unmodulated waves to limit the resultant phase-modulated waves therefrom substantially to waves of said fixed frequency and of either one of two materially different relatively fixed phases, said phases representing a binary digit one and a binary digit zero respectively, said first and second phase-modulating means being operative upon said first and second unmodulated waves respectively to impress upon said waves representations of independent sequences of binary digits to be combined, and means for comparing the phases of the first and second phase-modulated waves so produced, said third phase-modulating means being operative upon said third unmodulated wave and under the control of said phase-comparing means, to indicate by the phase of the resultand third phase-modulated wave a binary combination of the binary digits represented by the said first and second phase modulated waves respectively.

20. A binary adder comprising sources of first, second and third unmodulated waves of substantially fixed frequency, phase and amplitude, first, second and third phase-modulating means operable upon said respective unmodulated wave to limit the resultant phase-modulated waves therefrom substantially to waves of said fixed frequency and of either one of two materially different relatively fixed phases, said phases representing a binary digit one and a binary digit zero respectively, said first and second phase-modulating means being operative upon said first and second unmodulated waves respectively to impress upon said waves representations of independent sequences of binary digits to be added, and means for comparing the phases of the first and second phase-modulated waves so produced, said third phase-modulating means being operative upon said third unmodulated wave and under the control of said phase-comparing means, to indicate by the phase of the resultant third phase-modulated wave the binary sum of the binary digits represented by the said first and second phase-modulated waves respectively.

21. A carry system for binary addition comprising a regenerative carry loop, means to establish oscillations in said carry loop capable of assuming either of only two stable phase conditions and of the same frequency, said means being responsive to a phase modulated wave of said frequency impressed upon said carry loop to initiate a changeover in said loop to conform to the phase condition represented by the said impressed wave if the loop is not already in said phase condition, means for comparing waves respectively representing two binary digits to be added, to determine whether both digits are ones, or both zeros, or whether one digit is a zero and the other digit is a one, and means operative under the control of said comparing means to impress upon said carry loop a phase modulated wave representative of one of said stable phase conditions when the binary digits to be added are both ones, to impress upon said carry loop a phase modulated wave representative of the other of said stable phase conditions when the binary digits to be added are both zeros, and to leave said carry loop substantially unaffected when the binary digits to be added are unlike.

22. A carry system for use in binary full addition of a multi-digit addend and a multi-digit augend in successive stages, digit by digit, with carry, if any from stage to stage, which carry system comprises means for distinguishing three cases, namely, one: addend and augend both binary zeros; two: addend and augend both binary ones; three: addend and augend digits unlike; and a carry loop controlled by said distinguishing means, said carry loop having two stable conditions of the same frequency representative of a carry digit zero and a carry digit one respectively, said distinguishing means being operative in case one to change the carry loop to the condition representing digit zero if the loop initially is in the condition representing digit one and to leave the carry loop in the condition representing digit zero if the loop is initially in that condition, said distinguishing means being operative in case two to change the carry loop to the condition representing digit one if the loop initially is in the condition representing digit zero and to leave the carry loop in the condition representing digit one if the loop is initially in that condition, said distinguishing means in case three leaving the carry loop in the condition it is in initially.

23. A system for performing binary full addition of a multi-digit addend and a multi-digit augend in successive stages of addition, digit by digit, with carry, if any from stage to stage, which system comprises means responsive to waves representative of the addend and augend of the instant stage and of the carry of the preceding stage to determine the phase of a wave representative of the carry digit for the succeeding stage of addition, first logical Exclusive Or means actuated in accordance with the addend digit and the augend digit of the instant stage of addition to determine one value of a control signal when the addend digit and augend digit are like and another value of said control signal when the addend digit and augend digit are unlike, and second logical Exclusive Or means actuated in accordance with the value of said control signal and of said wave representative of the carry digit of the preceding stage to pass said last-mentioned wave representative of the carry digit of the preceding stage directly to a circuit indicative of the binary sum taking account of the carry, or to reverse the phase of said carry representing wave before so passing the same.

24. In apparatus for handling information, in combination, regenerative means comprising a subharmonic oscillator for generating oscillations at a constant frequency $f$, means for applying to said oscillator a wave, constant in amplitude and phase, of frequency $2f$ for restricting said oscillations to one of two phase conditions differing by substantially 180 degrees, said regenerative means having an input terminal for receiving a control wave of frequency $f$ for reversing the phase of said oscillations, means for applying to said input terminal a control wave of a first phase, representing a first bit of information, for establishing said oscillations in a first of said phase conditions, said regenerative means being adapted to maintain said oscillations stable in phase regardless of the phase of said control wave provided said control wave is smaller than a critical amplitude but being adapted to reverse the phase of its said oscillations in response to a reversal in phase of said control wave provided said control wave is greater than said critical amplitude, means responsive to other information for reversing the phase of said control wave and causing the amplitude thereof to be greater than said critical value, to reverse the phase of said oscillations, an output terminal, and means connecting said regenerative means to said output terminal to apply said oscillations to the same.

25. Apparatus according to claim 24 in which said regenerative means comprises means having an amplitude-limiting characteristic.

References Cited in the file of this patent

UNITED STATES PATENTS 2,321,269 Artzt ------------------- June 8, 1943

UNITED STATES PATENT OFFICE

CERTIFICATE OF CORRECTION

Patent No. 2,987,253 June 6, 1961

Kenneth E. Schreiner et al.

It is hereby certified that error appears in the above numbered patent requiring correction and that the said Letters Patent should read as corrected below.

Column 3, line 21, after "that" insert -- a --; column 4, line 30, for "throught" read -- through --; column 7, line 22, for "successtion" read -- succession --; column 16, line 12, for "third-modulated" read -- third phase-modulated --; column 18, line 57, for "and" read -- ant --.

Signed and sealed this 28th day of November 1961.

(SEAL)
Attest:

ERNEST W. SWIDER
Attesting Officer

DAVID L. LADD
Commissioner of Patents

USCOMM-DC